United States Patent [19]

Jepson

[11] Patent Number: 5,232,475
[45] Date of Patent: Aug. 3, 1993

[54] SLUG FLOW ELIMINATOR AND SEPARATOR

[75] Inventor: William P. Jepson, Athens, Ohio

[73] Assignees: Ohio University, Columbus, Ohio; University of Illinois, Urbana, Ill.

[21] Appl. No.: 934,791

[22] Filed: Aug. 24, 1992

[51] Int. Cl.$^5$ .............................................. B01D 19/00
[52] U.S. Cl. .......................................... 55/36; 55/199; 55/276; 166/267; 166/357
[58] Field of Search .................... 55/36, 174, 192, 193, 55/199, 276; 166/267, 357

[56] References Cited

U.S. PATENT DOCUMENTS

| | | | |
|---|---|---|---|
| 3,688,473 | 9/1972 | Brown | 55/38 |
| 3,960,525 | 6/1976 | Coggins | 55/178 |
| 4,435,196 | 3/1984 | Pielkenrood | 55/174 |
| 4,760,742 | 8/1988 | Hatton | 55/36 |

FOREIGN PATENT DOCUMENTS

| | | | |
|---|---|---|---|
| 1606145 | 11/1990 | U.S.S.R. | 55/159 |
| 931735 | 7/1963 | United Kingdom | 55/159 |
| 2153251 | 7/1987 | United Kingdom . | |
| 8701759 | 3/1987 | World Int. Prop. O. . | |

OTHER PUBLICATIONS

Potter, Neil, "Subsea First for Argyll," The Oilman, May 1988, pp. 16-17.
"Highlander Gets First Subsea Slug Catcher for Marginal-Field Development", Oil and Gas Journal, Nov. 11, 1985, pp. 58-59.
Handout—"Subsea Slug Catching," Taylor Forge Canada Inc.

Primary Examiner—Bernard Nozick
Attorney, Agent, or Firm—Killworth, Gottman, Hagan & Schaeff

[57] ABSTRACT

A method and apparatus for substantially eliminating slug flow and for separating the liquid phase of a liquid/gas mixture from the gas phase thereof is provided. A deceleration table contained within a housing decelerates liquid slugs and causes entrained gas to separate therefrom. The decelerated liquid passes through orifices in the deceleration table and is subsequently discharged from the housing while the separated gas rises above the deceleration table and is separately discharged from the housing. The liquid and gas phases can be recombined or permanently separated.

20 Claims, 4 Drawing Sheets

SLUG FLOW ELIMINATOR AND SEPARATOR

BACKGROUND OF THE INVENTION

The present invention relates to a method and apparatus for eliminating slug flow in multiphase pipelines and process equipment and for separating liquid phases from the gas phase in such a mixture. More particularly, the present invention relates to a method and apparatus for eliminating slug flow in a flow line containing petroleum liquids and natural gas and to a method and apparatus for separating the liquid phase of such a mixture from the gas phase thereof.

When liquid/gas mixtures move through a horizontal or inclined pipeline, the flow can take several configurations. At low liquid and low gas flow rates, the flow is stratified such that the gas phase flows above the liquid phase. At higher flow rates, waves form at the gas/liquid interface. If the gas phase flow rates are high enough, the waves can grow to the point where they fill the cross-section of the pipeline, blocking the gas flow. Such waves are termed slugs. Inasmuch as the flow rate of the gas phase is much higher than that of the liquid phase, the liquid slugs are accelerated by the gas phase to approximately the same velocity as the gas phase. The slugs thus travel at a much higher flow rate than the non-slug portion of the liquid phase. As a result, the piping and related equipment downstream of the slugs experience intermittent surges and subsequent impact from the slugs. As can be appreciated, such surging places tremendous stresses on the piping and process equipment.

When crude oil flows from wells, it is usually accompanied by natural gas, sand, water, and other components which produce a mixed phase flow. The oil/gas mixture often flows at production rates which place it in the slug flow regime. In addition, wells which have been partially depleted are generally subjected to enhanced recovery techniques to extract the remaining oil therefrom. Such techniques employ the injection of steam, gas, water, or chemicals to force the oil the oil bearing formation and thereby exacerbate the inherent slug flow problems associated with petroleum extraction.

It is well known to those skilled in the art that the stresses placed on oil pipelines by slug flow is a leading cause of their failure. Such stresses not only damage the pipelines and related equipment, but vibrations, abrupt pressure changes, and flow characteristics lead to corrosion in the piping and downstream equipment. To minimize such deleterious effects, crude oil is pumped at flow rates which are lower than the maximum potential output of the wells. However, this is undesirable from an economic standpoint since profitability of each well is directly proportional to the flow rate of petroleum therefrom. Thus, it is seen that there is a strong need to eliminate or control slug flow in petroleum pipelines.

Current solutions to the problem of slug flow provide large, complicated structures which are very expensive to manufacture and install. For example, Huntley, UK Patent No. 2,153,251, discloses a submersible liquid/gas separator apparatus with at least one hollow elongated separator pressure vessel into which a liquid/gas mixture is received. The separator vessel further includes two gas outlets and two liquid outlets. The liquid outlets are connected to a series of hollow elongated liquid accumulator pressure vessels which are rigidly interconnected and are positioned side-by-side in parallel with one another. The accumulator vessels are in fluid communication with one another and provide storage for collected oil.

Asheim, WO 87/01759, discloses a device for gathering liquid slugs in a pipeline. The pipeline leads to a large pipe loop on the seabed which has enough volume to gather all of the liquid from a slug. The loop leads to a riser which carries the liquid from the slug up to a separation tank on a platform.

Such prior art slug flow eliminators have several inherent drawbacks. They are large, complicated, expensive, and difficult to install and remove. Some commercially available slug flow eliminators, for example, weigh 60 tons, cost approximately $3-4 million, and measure 16 feet in height, 16 feet in width, and 23 feet in length. Such prior art slug flow eliminators are unsuitable for enhanced recovery of oil from partially depleted fields and for use in marginal fields.

In order for enhanced recovery from partially depleted fields to be profitable, the capital costs must kept to a minimum due to the relatively small amounts of oil that remain. As discussed above, enhanced recovery techniques result in severe slug flow problems. Although slug flow eliminators would make extraction of oil from partially depleted fields much easier, the high cost of current devices makes their use economically unfeasible.

Marginal fields are undepleted areas where small volumes of oil are present beneath the surface. In order to remove the oil in a cost effective manner, the capital outlay for such removal must be kept small. This can best be achieved by utilizing existing gathering stations and/or re-useable equipment. Most marginal fields are located great distances away from existing gathering stations. There are many different types of gathering stations. Some are located beneath the surface of the ocean, some on the surface of the ocean such as a drilling platform, and some are located on land. As those skilled in the art will appreciate, pumping oil over significant distances leads to severe slug flow problems. One or more slug flow eliminators are needed for each such pipeline in these circumstances. However, due to the expense of traditional slug flow eliminators and the relatively small amount of oil which can be extracted from each well in a marginal field, it is simply not cost effective to extract this oil.

An additional problem is that conventional slug flow eliminators are not re-useable. The pipelines to which they are to be attached must be significantly altered in order to accommodate their complicated configurations. It is not practical to make such extensive modifications repeatedly in order to reuse the slug flow eliminators. In addition, the size and weight of the slug flow eliminators of the prior art make them difficult to handle. Installation is a major undertaking.

Many current slug flow eliminators cause frothing and emulsions to occur in liquid/gas mixtures because the mixtures are brought to an abrupt halt inside the eliminators. The resultant turbulence produces liquid/gas emulsions or foam. Emulsion-breaking chemicals and mist eliminators must be used with such devices.

In order to remove scale and other types of buildup from the inside of petroleum pipelines, tight-fitting objects, referred to in the art as "pigs", are periodically forced through the pipeline. As is known by those skilled in the art, it is advantageous to be able to retrieve pigs from the pipeline at the slug flow eliminator. Due to the complicated structure of most slug flow eliminators, however, the retrieval of pigs therefrom is impossible.

A second area in which improvement over the prior art is needed concerns the separation of liquid/gas mixtures at ocean-based oil gathering stations. When petroleum is pumped from an undersea well to a gathering station, the gas phase must be separated from the liquid phase so that both phases can be processed separately. Currently, large separator tanks with vertical baffles are used for this purpose. As is known in the art, oceanic gathering station space is at a premium. The separator tanks currently in use, typically measuring 20 feet by 80 feet, take up large amounts of such space. In addition, such tanks are not equipped to handle severe slug flow. The vertical baffles are frequently destroyed by slugs of liquid impinging upon them and must be replaced. What is needed in this regard is a compact liquid/gas separator which is equipped to handle slug flow.

Accordingly, a need exists in the art for an in-line slug flow eliminator which is inexpensive, easy to maneuver, and re-useable, which does not produce foaming or an emulsion, and which allows the retrieval of pigs therefrom. In addition, a need exists for a liquid/gas separator for use with gathering stations which is both compact and able to eliminate slug flow.

SUMMARY OF THE INVENTION

That need is met by the present invention which provides an in-line slug flow eliminator which is, relative to prior art devices, inexpensive, compact, lightweight, and easy to handle. Such features allow the present slug flow eliminator to be easily installed and removed and thus facilitate its re. useability. The present slug flow eliminator provides for uniform, gradual deceleration of liquid slugs and thereby does not promote foaming or emulsion. The device can be further equipped with pig catching capabilities. In addition, the present invention also provides a liquid/gas separator for use with a gathering station which is both compact and able to eliminate slug flow.

According to one aspect of the present invention, an apparatus is provided for substantially eliminating slug flow in a liquid/gas mixture flowing through a pipeline. The apparatus comprises a housing which includes a pipe section, and at least one inlet for receiving the liquid/gas mixture from the pipeline, and a horizontally oriented deceleration table in the housing for decelerating liquid slugs in the liquid/gas mixture and for separating gas from the liquid slugs. The deceleration table extends longitudinally along the housing and has a first end at which the liquid/gas mixture is received thereupon from the inlet and a plurality of orifices through which liquid, including decelerated liquid from the liquid slugs, passes. The apparatus further comprises two opposing overflow gaps between the deceleration table and the housing through which liquid, including decelerated liquid from the liquid slugs, passes, a vapor chamber in the housing for accommodating the separated gas, at least one outlet in the vapor chamber for discharging the gas from the housing, a liquid collection chamber in the housing for accommodating the decelerated liquid, and at least one outlet in the liquid collection chamber for discharging the liquid from the housing.

In accordance with another aspect of the present invention, a method is provided for substantially eliminating slug flow in a liquid/gas mixture flowing through a pipeline, comprising the steps of providing a housing which includes a pipe section, directing the liquid/gas mixture from the pipeline onto a deceleration table in the housing for decelerating liquid slugs in the liquid/gas mixture and for separating gas from the liquid slugs. The deceleration table extends longitudinally along the housing and has a front end at which the liquid/gas mixture is received thereupon and also has a plurality of orifices and an overflow gap between the deceleration table and the housing through which liquid including decelerated liquid from the liquid slugs passes. The present method further comprises the steps of discharging the separated gas through at least one outlet from a vapor chamber in the housing, and discharging the decelerated liquid through at least one outlet from a liquid collection chamber in the housing.

Preferably, the diameter of the housing is greater than the diameter of the pipeline. More particularly, the diameter of the housing is up to six times greater than the diameter of the pipeline, thereby ensuring that enough volume exists in the housing to house a deceleration table with sufficient surface area to accommodate and decelerate the largest liquid slugs expected for the particular application in which the present slug flow eliminator is to be used, and for sufficient liquid and gas storage.

It is preferred that the deceleration table be oriented in a substantially horizontal position and that the deceleration table include a deceleration ramp located at a second end thereof opposite the inlet. The deceleration ramp is a precautionary measure to prevent the remnants of any unexpectedly large liquid slugs from impinging upon and damaging the portion of the housing adjacent the second end of the deceleration table.

Means are preferably located in the liquid collection chamber for dampening waves therein and for separating any solid particles from the decelerated liquid. Such means can include one or more perforated baffles.

It may be preferred that a pig receiver be mounted upon the housing and a pair of rails be mounted upon the deceleration table for directing a pig into the pig receiver. A convenient location for the pig receiver is on the downstream side of the slug flow eliminator.

In one version of the present invention, the decelerated liquid and the separated gas are recombined downstream from the apparatus. In this manner, the recombined liquid/gas mixture is either a substantially stratified flow without liquid slugs, or is a controlled slug flow. The recombining means may include a piping arrangement joining the vapor chamber and liquid collection chamber outlets with a pipeline downstream from the apparatus of the present invention. In another version of the invention, the present slug flow eliminator is adapted for use with a gathering station wherein the decelerated liquid and the separated gas are discharged separately to further processing equipment. In either version, the present invention is suited to handle many liquid/gas mixtures, such as petroleum and natural gas.

In accordance with an additional aspect of the present invention, a system is provided for collecting a liquid/gas mixture from at least one oil well and for separating the liquid portion of the mixture from the gaseous portion thereof, comprising at least one pipeline from each oil well, at least one apparatus fixed to each pipeline for substantially eliminating slug flow therein as described above, an oil gathering station connected to each pipeline, and at least one additional apparatus as described above for substantially eliminating slug flow, the additional apparatus being fixed to the gathering station and further causing the liquid portion of the liquid/gas mixture flowing through each pipeline to separate from the gaseous portion thereof.

Accordingly, it is an object of the present invention to provide an in-line slug flow eliminator which is inexpensive, easy to maneuver, and re-useable, which does not produce foaming or an emulsion, and which allows the retrieval of pigs therefrom. It is a further object to provide a liquid/gas separator for use at a gathering station which is both compact and able to eliminate slug flow. These and other objects and advantages of the present invention will become apparent from the following detailed description, the accompanying drawings, and the appended claims.

DETAILED DESCRIPTION OF THE PREFERRED EMBODIMENT

Figure 1:
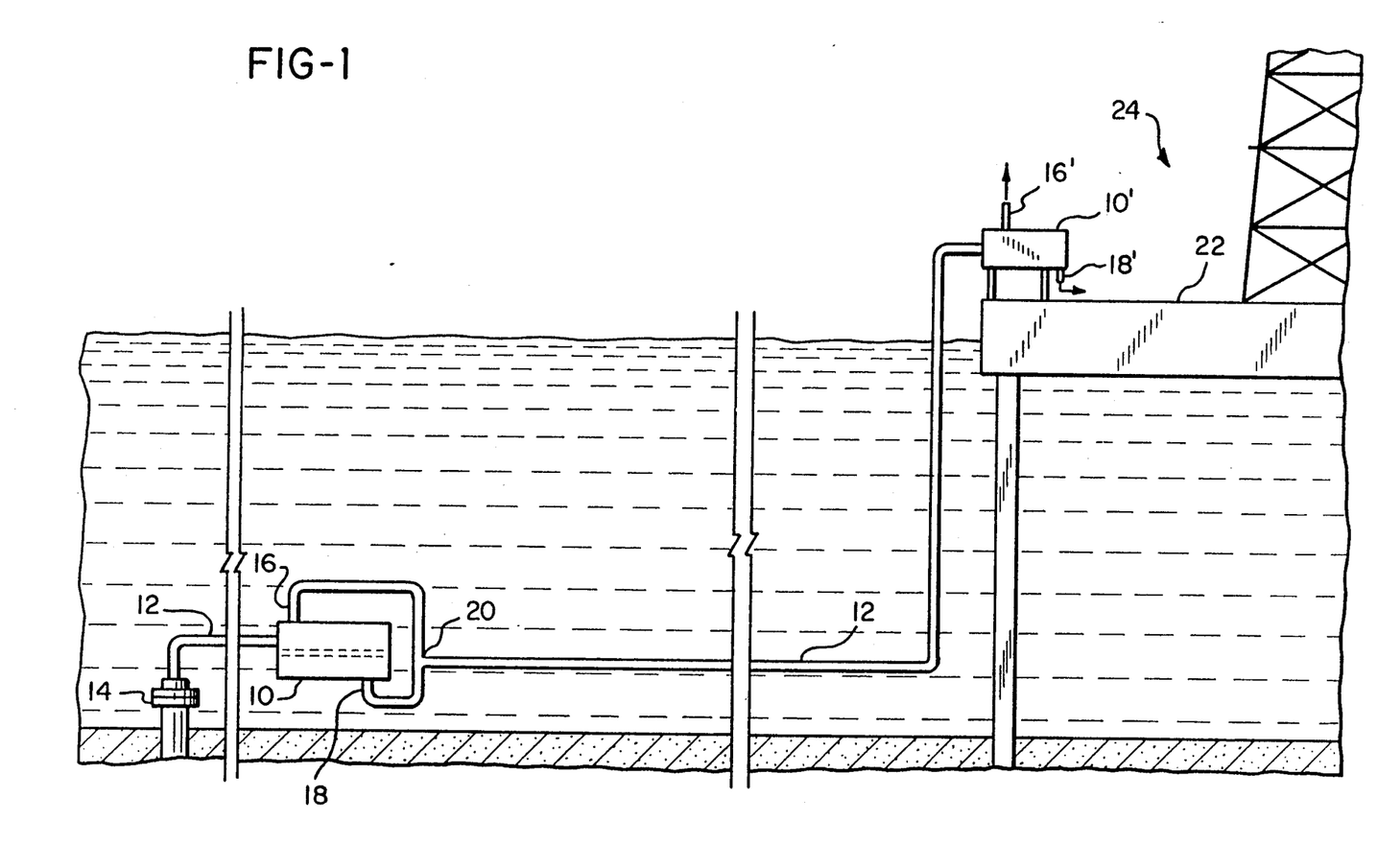
FIG. 1 is a schematic view of the present slug flow eliminator both connected to an undersea oil pipeline and attached to the deck of oil drilling platform.

Referring now to FIG. 1, two versions of the present slug flow eliminator 10 are illustrated in schematic form. It is to be understood that FIG. 1 is not to scale. In the first version, slug flow eliminator 10 is attached to pipeline 12 which is in turn connected to oil well 14. One or more slug flow eliminators 10 may be placed along pipeline 12 in those locations where slug flow is known or has a propensity to exist. Such locations are well known to those skilled in the art. Preferably, a slug flow eliminator 10 would be placed upstream of portions of pipeline 12 or equipment attached thereto in those areas prone to slug flow in order to prevent liquid slugs from damaging such portions or equipment.

As will be described in greater detail below, slug flow eliminator 10 substantially eliminates liquid slugs which form in a liquid/gas mixture, which includes petroleum and natural gas, flowing through pipeline 12. As will also be further described below, the liquid phase of the mixture is separated from the gas phase thereof in slug flow eliminator 10. The gas phase is discharged from slug flow eliminator 10 through vapor outlet 16 and the liquid phase is discharged through liquid outlet 18. The two phases are recombined in pipeline 12 downstream of slug flow eliminator 10 at manifold 20. With the liquid slugs substantially eliminated, the recombined liquid/gas mixture will either be a stratified flow or a more controlled slug flow.

In the event that downstream conditions cause slug flow to occur once again in the liquid/gas mixture, additional slug flow eliminators 10 can be added as needed to pipeline 12. In this manner, flow through pipeline 12 can be maintained in substantially stratified form to minimize damage to and corrosion in pipeline 12 and related equipment. Thus, slug flow eliminator 10 makes possible the pumping of oil over great distances such as from remote marginal fields to existing gathering stations. Such an arrangement permits oil to be profitably extracted from marginal fields by minimizing the capital outlay needed from such extraction since costly new oil drilling platforms do not have to be built and installed in the marginal fields.

As will be appreciated, the present slug flow eliminator is uniquely suited for this role in that it is lightweight and inexpensive due to its simplistic design and can easily be installed and removed since its overall length can be made the length of a section of piping in pipeline 12. It should be understood, however, that the present slug flow eliminator can be used to substantially eliminate slug flow in any type of liquid/gas mixture, and that the presently described use of the slug flow eliminator in the field of oil production is intended only as an example.

A second version of the present slug flow eliminator is shown attached to the deck 22 of oil drilling platform 24. The liquid/gas mixture comprising petroleum and natural gas from oil well 14 enters slug flow eliminator 10' through pipeline 12. In this manner, slug flow eliminator 10' serves a dual role: it substantially eliminates slugs of liquid flowing through pipeline 12 to prevent the equipment on oil drilling platform 24 from being damaged thereby and it separates the liquid phase of the liquid/gas mixture from the gas phase thereof so that each phase can be separately processed on oil drilling platform 24. In the latter role, the gas phase is discharged from slug flow eliminator 10' via vapor outlet 16' and the liquid phase is discharged via liquid outlet 18'.

The second version of the present slug flow eliminator conserves valuable space on the deck 22 of oil drilling platform 24 by eliminating the need for both a slug flow eliminator and a separator, and by virtue of being much smaller than conventional oil drilling platform separators. The length of either version 10 or 10' of the present slug flow eliminator can be as little as 6 to 10 feet. As will be discussed more fully below, the diameter of the present slug flow eliminator is dependent upon the diameter of the pipeline to which the slug flow eliminator is connected. By way of example, for a pipeline having a diameter of 6 inches, the preferred diameter of slugflow eliminator 10 or 10' would range from 12 inches to 36 inches. When compared to the typical 20 feet by 80 feet size of conventional gathering station separators, the amount of space which is conserved by the present slug flow eliminator becomes readily apparent.

Figure 2:
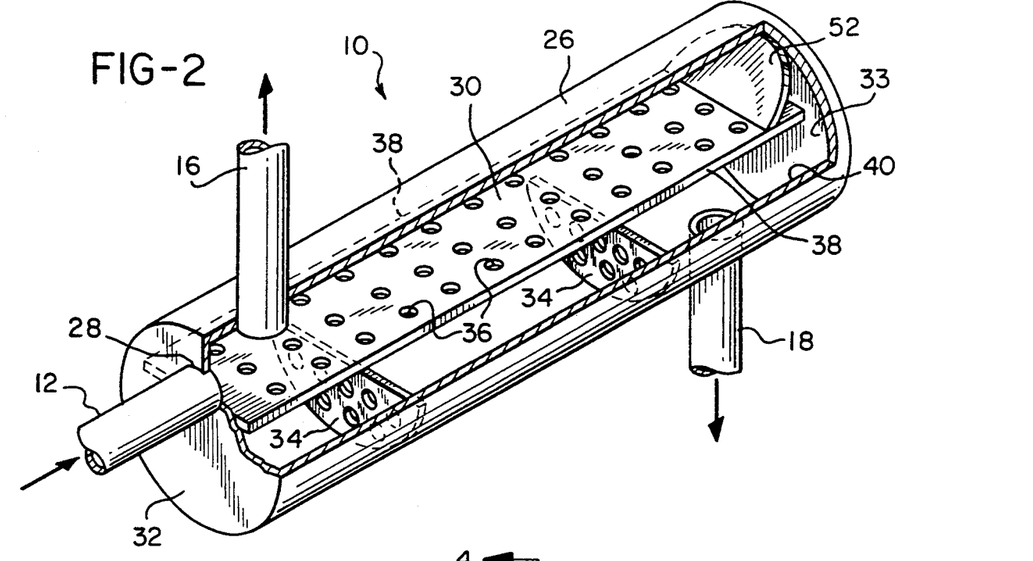
FIG. 2 is a schematic view of the present slug flow eliminator.

Referring now to FIG. 2, the structure of the present slug flow eliminator is shown in greater detail. The reference numerals in FIG. 1 are applicable to like elements in FIGS. 2-6. In particular, the reference numerals 10, 16, and 18 in FIGS. 2-6 refer to 10', 16', and 18', respectively, as well as to 10, 16, and 18, respectively, in FIG. 1. Slug flow eliminator 10 comprises a housing 26 which includes at least one inlet 28 for receiving a liquid/gas mixture from pipeline 12. Housing 26 preferably consists of a generally cylindrical pipe section. The preferred material of construction for housing 26 is any rigid material having high corrosion resistance properties such as 316 stainless steel. For ease of installation and removal, the overall length of housing 26 should be equal to the length of a section of pipeline with which slug flow eliminator 10 is intended to be used. In this manner, a section of pipeline can simply be removed and replaced with slug flow eliminator 10. When the oil well associated with slug flow eliminator 10 becomes depleted, it is a simple matter to remove slug flow eliminator 10 from the pipeline and attach it to another pipeline or, as desired, to a gathering station. This capability for convenient re-use constitutes another significant advantage of the present invention.

Contained within housing 26 is deceleration table 30 for decelerating liquid slugs in a liquid/gas mixture and for separating gas from the liquid slugs. Deceleration table 30 preferably extends longitudinally along substantially the entire length of housing 26. Deceleration table 30 can be attached to first end 32 and to second end 33 of housing 26 by any convenient manner such as by welding or bolting it in place. Alternatively, deceleration table 30 can be supported by and/or attached to baffles 34. The preferred material of construction for deceleration table 30 is 316 stainless steel. However, any rigid, corrosion resistant material will suffice. It is preferred that deceleration table 30 be oriented in a substantially horizontal position. In this manner, the largest surface of deceleration table 30 is positioned substantially parallel to the direction of flow of an incoming liquid/gas mixture from inlet 28.

Deceleration table 30 further contains a plurality of orifices 36 through which liquid, including decelerated liquid from liquid slugs, passes. Since deceleration table 30 is oriented in a substantially horizontal position, the liquid passes through orifices 36 by force of gravity. Orifices 36 preferably have sufficient surface area to allow the liquid to pass without impedance due to surface tension and to allow gas to simultaneously pass in the opposite direction. The surface area of orifices 36 should not be so large, however, that substantially all or most of the liquid passes through those orifices 36 located nearest inlet 28. The size of orifices 36 should thus be selected to achieve a balance between the aforementioned concerns. It has been found that the preferred size and shape to achieve this balance is a circular orifice with a one inch diameter. The total number of orifices 36 disposed upon deceleration table 30 is dependent upon the maximum expected liquid flow rate through slug flow eliminator 10 such that deceleration table 30 does not become flooded when it encounters a large liquid slug. Further to ensure against flooding, two opposing overflow gaps between the two side edges 38 of deceleration table 30 and the inner diameter surface 40 of housing 26 are provided over which liquid, including decelerated liquid from liquid slugs, passes.

Preferably, the diameter of housing 26 is greater than the diameter of pipeline 12. More preferably, the diameter of housing 26 is up to six times greater than the diameter of pipeline 12, thereby ensuring that enough volume exists in housing 26 to house a deceleration table 30 having sufficient surface area to accommodate and decelerate the largest liquid slugs expected for the particular application in which slug flow eliminator 10 is to be used.

Figure 3:
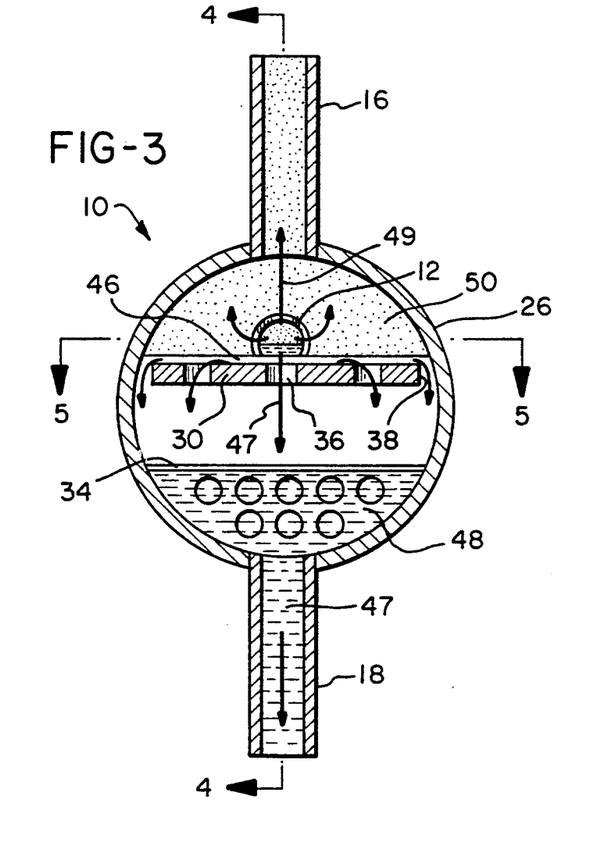
FIG. 3 is a front elevational view of the present slug flow eliminator taken along view line 3—3 in FIG. 4.
Figure 4:
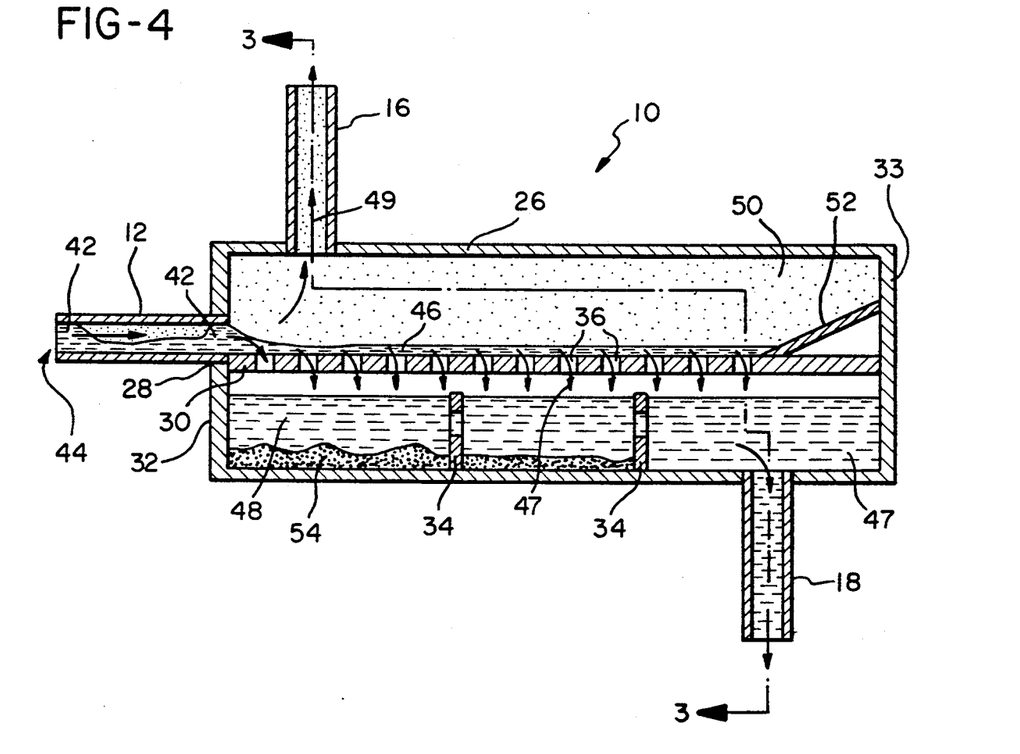
FIG. 4 is a side elevational view of the present slug flow eliminator taken along view line 4—4 in FIG. 3.
Figure 5:
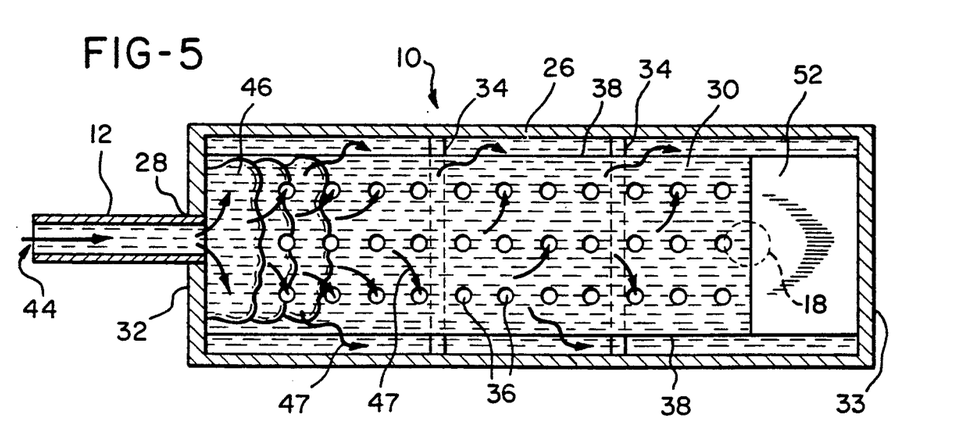
FIG. 5 is a top view of the present slug flow eliminator taken along view line 5—5 in FIG. 3.

Referring now to FIGS. 3-5, the structure and operation of slug flow eliminator 10 will be more specifically described. Liquid slugs 42 in liquid/gas mixture 44 flowing through pipeline 12 enter housing 26 via inlet 28. Upon entering housing 26, liquid slugs 42 detach from the pipe wall and immediately spread into a stratified, mostly liquid film 46 on deceleration table 30. The cross-sectional flow area on deceleration table 30 is much greater than that of pipeline 12. Furthermore, the mass flow rate of the liquid phase of liquid/gas mixture 44 remains constant through slug flow eliminator 10, as it must since no liquid is being created, added, or taken away. Accordingly, the linear flow rate, or velocity, of the liquid phase of liquid/gas mixture 44 will be inversely proportional to the increase in cross-sectional flow area on deceleration table 30 over that of pipeline 12. As a result, the velocity of the liquid phase of liquid/gas mixture 44 will decrease substantially but gradually on deceleration table 30. The resultant deceleration in liquid phase velocity causes the momentum of liquid slugs 42 to dissipate and thereby prevents damage to downstream piping and equipment. In addition, the gas pockets behind the slugs pass into vapor chamber 50.

After the velocity of liquid slugs 42 has decelerated to nearly zero, previously entrained gas separates therefrom. Decelerated liquid 47 falls through orifices 36 and over side edges 38 of deceleration table 30 and into liquid collection chamber 48, while de-entrained, separated gas 49 rises above deceleration table 30 and into vapor chamber 50. Similarly, the non-slug liquid phase of liquid/gas mixture 44 and non-entrained gas phase thereof separate as the non-slug liquid spreads into a film, decelerates, and falls through orifices 36 and over side edges 38 and into liquid collection chamber 48, while the non-entrained gas rises above deceleration table 30 and into vapor chamber 50. Thus, slug flow eliminator 10 effectively separates the liquid phase of liquid/gas mixture 44 from the gas phase thereof in addition to substantially eliminating liquid slugs 42. Furthermore, since the deceleration of liquid slugs 42 and non-slug liquid on deceleration table 30 takes place gradually, foaming and emulsions will not be produced.

Attached to vapor chamber 50 is vapor outlet 16 for discharging separated gas 49 from housing 26. Similarly, liquid collection chamber 48 contains liquid outlet 18 for discharging decelerated liquid 47 from housing 26.

Preferably, deceleration table 30 includes deceleration ramp 52 located opposite inlet 28. Deceleration ramp 52 prevents the remnants of unexpectedly large liquid slugs 42 from impinging upon and damaging second end 33 of housing 26. Alternatively, housing 26 can be slightly inclined such that second end 33 is slightly higher than first end 32. Such orientation causes the liquid phase of liquid/gas mixture 44 to decelerate at a faster rate and thus similarly prevents unexpectedly large liquid slugs 42 from impinging upon second end 33.

Perforated baffles 34 are preferably located in liquid collection chamber 48 for dampening waves therein and for separating any solid particles 54 from decelerated liquid 47.

Figure 6:
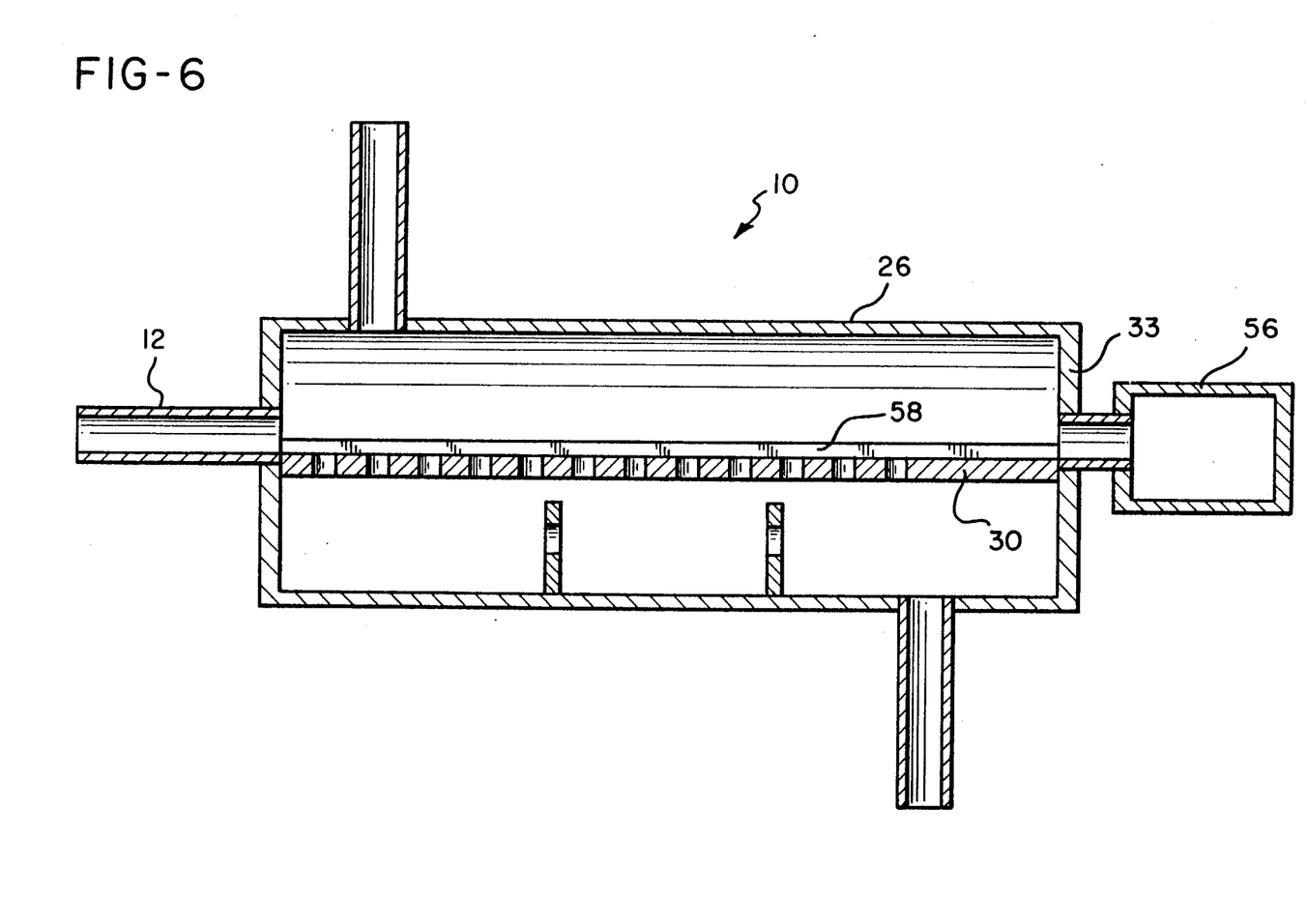
FIG. 6 is a side elevational view of the present slug flow eliminator with a pig receiver and guiding rails.

Referring now to FIG. 6, slug flow eliminator 10 is illustrated with optional pig receiving capabilities. Pig receiver 56 can be mounted upon housing 26 for receiving and retrieving a pig (not shown). As discussed above, a pig is a tight fitting object periodically forced through pipelines in order to remove scale and other types of buildup from the inside thereof. To guide a pig into pig receiver 56, a pair of parallel rails 58 (only one shown) are mounted upon deceleration table 30. Rails 58 are spaced apart by a distance equal to the inner diameter of pipeline 12. Pig receiver 56 is preferably attached to second end 33 of housing 26.

While a representative embodiment and certain details have been shown for purposes of illustrating the invention, it will be apparent to those skilled in the art that various changes in the methods and apparatus disclosed herein may be made without departing from the scope of the invention, which is defined in the appended claims.

What is claimed is:

1. A method for substantially eliminating slug flow in a liquid/gas mixture flowing through a pipeline, comprising the steps of:
    providing a housing, said housing comprising a pipe section;
    directing said liquid/gas mixture from said pipeline onto a deceleration table in said housing for decelerating liquid slugs in said liquid/gas mixture and for separating gas from said liquid slugs, said deceleration table extending longitudinally along said housing and having a front end at which said liquid/gas mixture is received thereupon and having a plurality of orifices and an overflow gap between said deceleration table and said housing through which liquid, including decelerated liquid from said liquid slugs, passes;
    discharging said separated gas through at least one outlet from a vapor chamber in said housing for accommodating said gas;
    discharging said decelerated liquid through at least one outlet from a liquid collection chamber in said housing for accommodating said decelerated liquid.

2. The method of claim 1 wherein said housing has a diameter which is up to six times greater than that of said pipeline.

3. The method of claim 1 wherein said deceleration table further includes a deceleration ramp located at a second end thereof opposite said first end, said deceleration ramp preventing said liquid slugs from inpinging upon the portion of said housing adjacent said second end.

4. The method of claim 1 further including the step of providing means in said liquid collection chamber for dampening waves therein and for separating solid particles from said decelerated liquid.

5. The method of claim 1 further including the step of recombining said decelerated liquid and said separated gas.

6. The method of claim 1 further including the step of separately discharging said decelerated liquid and said separated gas to further processing equipment.

7. The method of claim 6 wherein said steps occur at a gathering station.

8. The method of claim 1 wherein said liquid/gas mixture comprises petroleum and natural gas.

9. An apparatus for substantially eliminating slug flow in a liquid/gas mixture flowing through a pipeline, comprising:
    a housing, said housing comprising a pipe section and at least one inlet for receiving said liquid/gas mixture from said pipeline;
    a deceleration table in said housing for decelerating liquid slugs in said liquid/gas mixture and for separating gas from said liquid slugs, said deceleration table extending longitudinally along said housing and having a first end at which said liquid/gas mixture is received thereupon from said inlet and having a plurality of orifices through which liquid, including decelerated liquid from said liquid slugs, passes;
    two opposing overflow gaps between said deceleration plate and said housing through which liquid, including decelerated liquid from said liquid slugs, passes;
    a vapor chamber in said housing for accommodating said separated gas, said vapor chamber having at least one outlet for discharging said gas from said housing;
    a liquid collection chamber in said housing for accommodating said decelerated liquid, said liquid chamber having at least one outlet for discharging said liquid from said housing.

10. The apparatus of claim 9 wherein said deceleration table is oriented in a substantially horizontal position.

11. The apparatus of claim 9 wherein said deceleration table further includes a deceleration ramp located at a second end thereof opposite said inlet, said deceleration ramp preventing said liquid slugs from impinging upon the portion of said housing adjacent said second end.

12. The apparatus of claim 9 further including a pig receiver mounted upon said housing and a pair of rails upon said deceleration table for directing a pig into said pig receiver.

13. The apparatus of claim 9 adapted for use at a gathering station wherein said decelerated liquid and said separated gas are discharged separately to further processing equipment.

14. The apparatus of claim 9 wherein the diameter of said housing is greater than the diameter of said pipeline.

15. The apparatus of claim 14 wherein the diameter of said housing is up to six times greater than the diameter of said pipeline.

16. The apparatus of claim 9 further including means located in said liquid collection chamber for dampening waves therein and for separating solid particles from said decelerated liquid.

17. The apparatus of claim 16 wherein said means for dampening waves and separating solid particles includes one or more perforated baffles.

18. The apparatus of claim 9 including means for recombining said decelerated liquid and said separated gas downstream from said apparatus.

19. The apparatus of claim 18 wherein said recombining means includes a piping arrangement joining said vapor chamber and liquid collection chamber outlets with a pipeline downstream from said apparatus.

20. A system for extracting a liquid/gas mixture which includes petroleum from at least one undersea oil well and for separating the liquid portion of said mixture from the gaseous portion thereof, comprising:
    at least one pipeline from each said oil well;
    at least one apparatus fixed to each said pipeline for substantially eliminating slug flow in said liquid/gas mixture flowing through each said pipeline comprising:
    a housing, said housing comprising a pipe section and at least one inlet for receiving said liquid/gas mixture from said pipeline;
    a deceleration table in said housing for decelerating liquid slugs in said liquid/gas mixture and for separating gas from said liquid slugs, said deceleration table extending longitudinally along said housing and having a first end at which said liquid/gas mixture is received thereupon from said inlet and having a plurality of orifices through which liquid, including decelerated liquid from said liquid slugs, passes;

two opposing overflow gaps between said deceleration plate and said housing through which liquid, including decelerated liquid from said liquid slugs, passes;

a vapor chamber in said housing for accommodating said separated gas, said vapor chamber having at least one outlet for discharging said gas from said housing;

a liquid collection chamber in said housing for accommodating said decelerated liquid, said liquid chamber having at least one outlet for discharging said liquid from said housing;

a gathering station connected to each said pipeline;

at least one said apparatus for substantially eliminating slug flow, said apparatus being fixed to said gathering station and further causing the liquid portion of said liquid/gas mixture flowing through each said pipeline to separate from the gaseous portion thereof.

* * * * *

UNITED STATES PATENT AND TRADEMARK OFFICE
CERTIFICATE OF CORRECTION

PATENT NO. : 5,232,475
DATED : August 3, 1993
INVENTOR(S) : William P. Jepson

It is certified that error appears in the above-indentified patent and that said Letters Patent is hereby corrected as shown below:

Col. 9, line 17,          "a front end" should read --a first end--.

Col. 9, lines 66 and 67,  "slugs, passes:" should read --slugs, passes;--.

Signed and Sealed this

Third Day of May, 1994

Attest:

BRUCE LEHMAN

*Attesting Officer*          Commissioner of Patents and Trademarks